United States Patent [19]
Lane et al.

[10] Patent No.: US 6,775,383 B1
[45] Date of Patent: Aug. 10, 2004

(54) ADAPTIVE VIBRO-ACOUSTIC ATTENTUATOR FOR LAUNCH VEHICLES

(75) Inventors: Steven A. Lane, Albuquerque, NM (US); Steven F. Griffin, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 668 days.

(21) Appl. No.: 09/681,196

(22) Filed: Feb. 16, 2001

(51) Int. Cl.[7] .................... A61F 11/06; H03B 29/00
(52) U.S. Cl. .................... 381/71.1; 381/71.4
(58) Field of Search ............... 381/86, 71.2, 71.4, 381/71.1; 280/5.512, 5.515; 181/207, 208, 209

(56) References Cited

U.S. PATENT DOCUMENTS

| | | | | |
|---|---|---|---|---|
| 5,590,849 A | * | 1/1997 | Pla | 381/71.5 |
| 5,719,945 A | * | 2/1998 | Fuller et al. | 381/71.2 |
| 6,022,005 A | * | 2/2000 | Gran et al. | 248/550 |
| 6,196,514 B1 | * | 3/2001 | Kienholz | 248/550 |
| 6,290,183 B1 | * | 9/2001 | Johnson et al. | 248/557 |

OTHER PUBLICATIONS

Johnson, M. E., and Elliott, S. J., "Active Control of Sound Radiation from Vibrating Surfaces Using Arrays of Discrete Actuators," *Journal of Sound and Vibration*, vol. 207, No. 5, pp. 743–759.

Doria, A., "Control of Acoustic Vibrations of an Enclosure by Means of Multiple Resonators," *Journal of Sound and Vibration*, vol. 181, No. 4, pp. 673–685.

Griffin, S., Lane, S. A., and Leo, D., "Power Consumption for Active Acoustic Control of Launch Vehicle Payload Fairings," *2000 International Mechanical Engineering Congress and Exposition*, Orlando, Florida, Nov. 2000.

* cited by examiner

*Primary Examiner*—Stella Woo
(74) *Attorney, Agent, or Firm*—James M. Skorich; Kenneth E. Callahan

(57) ABSTRACT

A lightweight self-contained vibro-acoustic device is disclosed for dissipating low frequency vibration and acoustic energy within the payload fairing of launch vehicles. The device can be mounted on the interior surfaces of a fairing and adaptively tuned to match targeted structural and acoustic dynamics using electronic feedback loops.

20 Claims, 5 Drawing Sheets

CROSS-SECTION
EXPLODED VIEW

CROSS-SECTION EXPLODED VIEW

ADAPTIVE VIBRO-ACOUSTIC ATTENTUATOR FOR LAUNCH VEHICLES

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

The present invention is related to the field of vibration and noise control, and in particular is designed for dissipating low frequency vibration and acoustic energy within the payload fairing of launch vehicles.

Current developments in the use of advanced composite structures for fairing design and fabrication has necessitated the development of innovative vibro-acoustic technologies to mitigate the interior acoustic response of launch vehicles during powered flight. Advanced composite fairings provide increased structural stiffness with significantly less mass. As a result, low frequency noise more easily passes through the fairing to the payload area. This excites cavity resonances in the fairing, which may induce vibrations that damage the payload.

There has been considerable research showing that local vibration suppression can be used to reduce sound radiated from a vibrating structure. Johnson, M. E., and Elliott, S. J., Active Control of Sound Radiation from Vibrating Surfaces Using Arrays of Discrete Actuators, *Journal of Sound and Vibration*, Vol. 207, No. 5, pp. 743–759.) Radiated sound pressure from flexible, vibrating structures can be reduced using either active or passive approaches. This is achieved by using active or passive actuators to change the structural impedance as seen by disturbance inputs, thereby reducing the transmission of energy. In addition, the actuators change the radiation characteristics of the structure, making it less efficient at radiating acoustic energy.

There has also been significant work that demonstrates the use of acoustic resonators as acoustic dampers to dissipate acoustic energy in enclosures. (Doria, A., Control of Acoustic Vibrations of an Enclosure by Means of Multiple Resonators, *Journal of Sound and Vibration*, Vol. 181, No. 4, pp. 673–685.) These devices are tuned to one or multiple acoustic resonances of an acoustic enclosure. The acoustic energy couples to the device and creates motion of a diaphragm or air mass. The kinetic energy of this motion is dissipated through frictional forces, providing the mechanism for reducing energy in the system.

In order to develop a mechanism to reduce the fairing vibro-acoustic environment, there are several critical engineering design obstacles to overcome. Primarily, the mechanism for attenuation must not interfere with the operation of payload deployment. This requirement prohibits the use of active control approaches that require wire and cable strung throughout the fairing. Preferably, the device would be easy to integrate into the fairing structure and be independent or stand-alone.

The next consideration is the volume-velocity and stroke requirements necessary to significantly affect the high sound pressure level environment that the device will experience during powered flight. At low frequencies (i.e., below 200 Hz), the overall sound pressure level can easily exceed 130 dB. Acoustic energy is predominately concentrated in the frequencies corresponding to fundamental structural resonances and acoustic resonances. It is at these frequencies that control is necessary, since current passive blanket treatments provide little abatement at low frequency. For low frequency attenuation, the stroke requirement (volumetric displacement) will be greater than would be the case for middle and high frequency applications. Volumetric requirements are a key limitation in active structural acoustic control approaches incorporating piezoelectric materials. (Griffin, S., Lane, S. A., and Leo, D., Power Consumption for Active Acoustic Control of Launch Vehicle Payload Fairings, 2000 *International Mechanical Engineering Congress and Exposition*, Orlando, Fla., November 2000.) Obviously, the device must be lightweight. A key motivation for using composite fairings is to reduce fairing weight and facilitate launching larger payload mass. Therefore, it would be impractical to develop acoustic treatments that significantly infringe on the weight savings. Robustness of the control approach must be assured. As each launch costs millions of dollars in addition to the millions of dollars that the payload costs, any acoustic treatment must involve zero risk.

Another critical aspect in mitigating the launch environment is the ability to adapt to the time-varying nature of the environment. During accent, the intensity and sources of the vibro-acoustic disturbances vary. Also, the acoustic wavespeed and air density change during accent, which results in significant variations of the acoustic resonance frequencies. Likewise, the structural resonance frequencies will also vary. A unique requirement for launch vehicle actuators is that they are subjected to vacuum pressure in space. Therefore, any actuator design must adequately consider the effects that this transition imposes on the device.

Prior art in acoustic mitigation has failed to adequately address the specific conditions experienced during launch. Passive approaches, such as taught in U.S. Pat. No. 6,170, 605, provide little absorption at low frequencies where a significant amount of acoustic energy is concentrated due to the acoustic resonances of the fairing cavity. Active noise control strategies suggested for acoustic mitigation in aircraft and automobiles are not practical for launch vehicles. Methods taught in the prior art, such as U.S. Pat. No. 5,485,523, U.S. Pat. No. 5,590,849, or U.S. Pat. No. 5,778, 081, include multiple sensors, actuators, or controllers, which must be networked together by wires to sense the disturbance, generate a control signal, and then apply the control signal to the actuators. This would be unacceptable in launch vehicle applications, due to the inability to arbitrarily place sensors, actuators, and wiring throughout the fairing.

There have been acoustic devices designed to dissipate acoustic energy in enclosures, such as those taught by U.S. Pat. No. 5,771,300, U.S. Pat. No. 5,848,169, U.S. Pat. No. 5,974,155, U.S. Pat. No. 6,151,396, and U.S. Pat. No. 6,138,947. Many of these inventions use feedback loops with motion or pressure sensors to servo-control a speaker diaphragm, and increase the resistive acoustic impedance of the device, hence dissipating acoustic energy. Some devices are used directly as acoustic actuators to produce anti-noise, which are sound waves generated out-of-phase to a primary disturbance source. This results in cancellation of the noise under optimal circumstances.

The prior art in acoustic attenuation does not incorporate a mechanism to increase the transmission loss through the fairing. Although a primary feature of the present invention is the ability to damp low frequency acoustic cavity resonances, significant benefit can be achieved by changing the structural impedance of the fairing wall and thereby reducing the transmissibility of external vibro-acoustic energy. Prior art does not consider the loss of pressure in the fairing during accent, or the variation of acoustic resonances due to changes in the acoustic wave speed. These problems are specific to launch vehicles.

SUMMARY OF INVENTION

The present invention is a stand-alone, adaptive vibro-acoustic damper device. Multiple devices would be attached to the inside of a launch vehicle fairing structure at discrete locations. The devices provide both acoustic and structural energy dissipation, and reactive structural impedance to reduce the transmission of external vibro-acoustic energy into the structure. The device provides an efficient method of coupling to the fairing acoustic dynamics and dissipating energy and is particularly suited for attenuating low frequency acoustic energy. It is vented to enable pressure equalization during accent. Adaptability of the device to changing environmental parameters is achieved using a servo-control loop.

BRIEF DESCRIPTION OF DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DETAILED DESCRIPTION

This invention provides both vibration and acoustic mitigation using feedback loops to tune the device to target structural and acoustic resonance frequencies, and it employs adaptive control algorithms to track and maintain optimum control of the dynamics.

Figure 1:
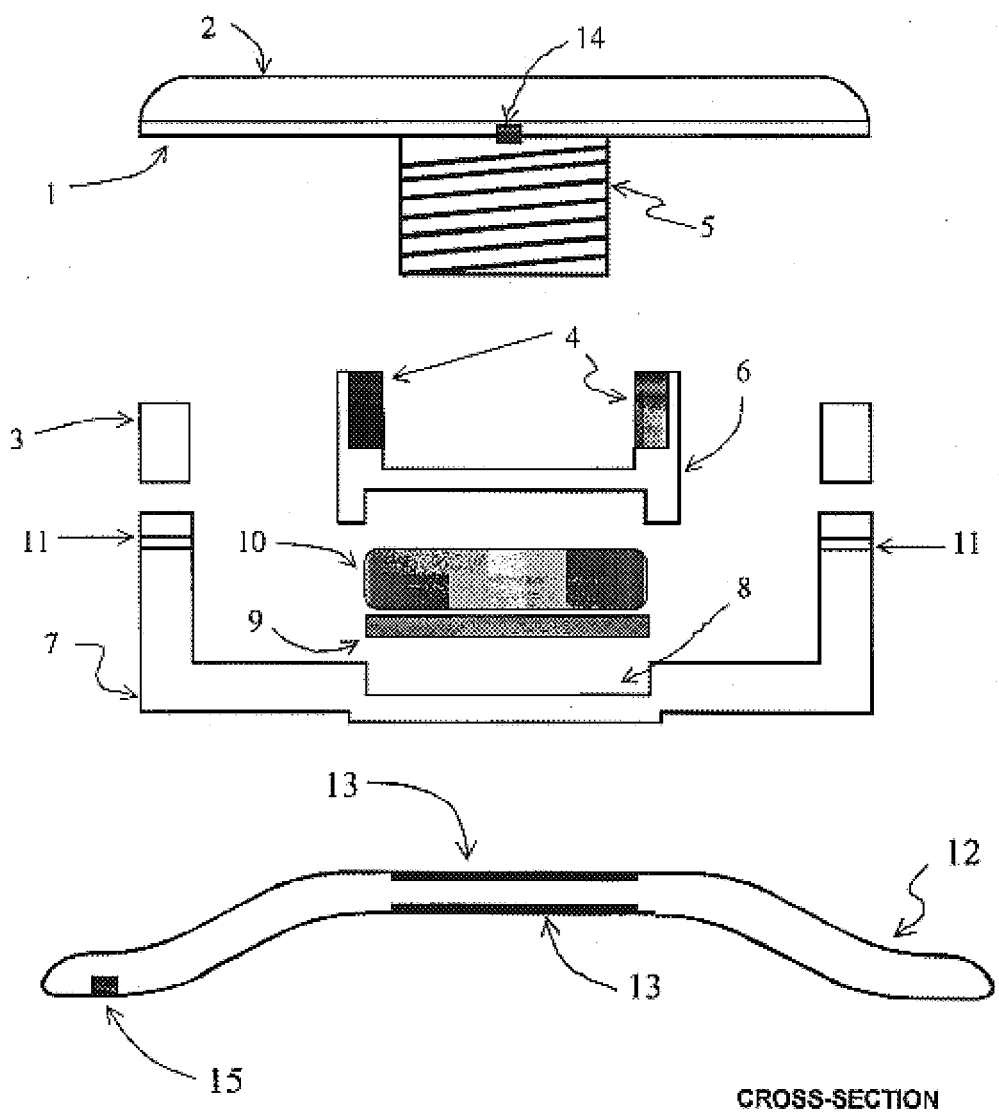
FIG. 1 is a cross-section schematic diagram of the invention in an exploded view.
Figure 2:
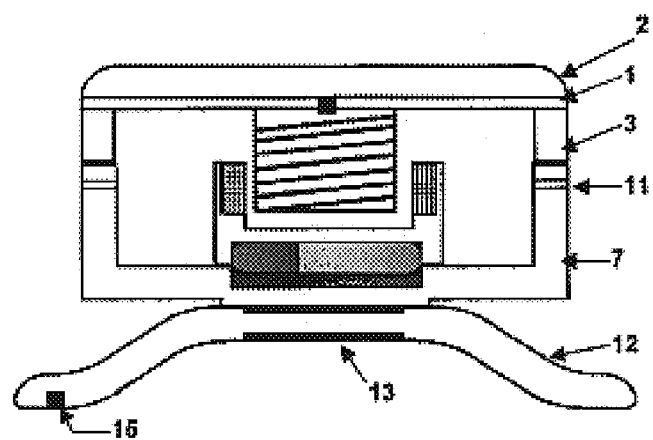
FIG. 2 is a cross-section schematic diagram of the assembled device.
Figure 3:
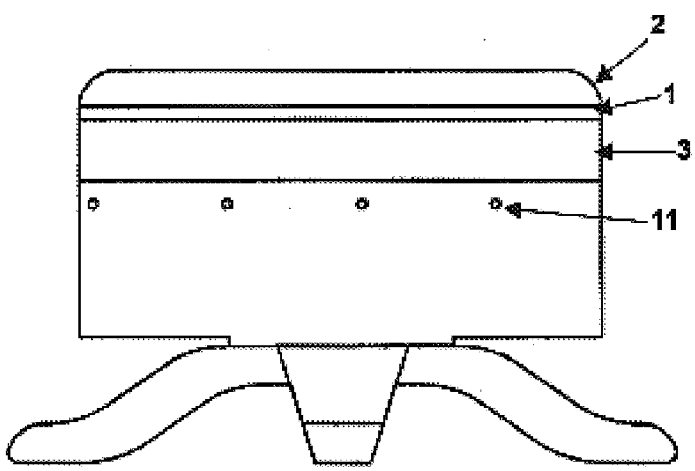
FIG. 3 is an external side view of the assembled device.
Figure 4:
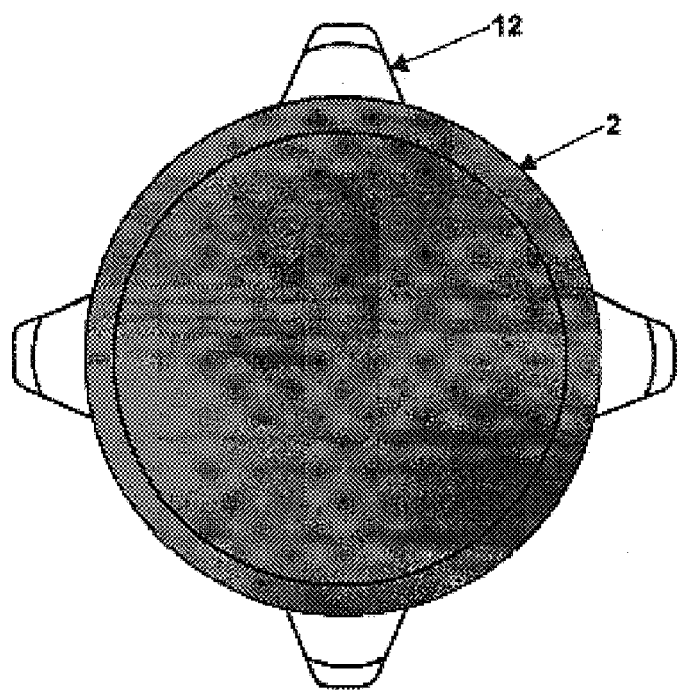
FIG. 4 is an external top view of the assembled device.

A cross-section exploded-view schematic of the preferred embodiment of the device is presented in FIG. 1. The invention comprises a panel, membrane, or diaphragm to couple to the acoustic dynamics of the fairing cavity. This diaphragm 1 is treated with porous material 2 to better match the acoustic impedance of the cavity. The diaphragm 1 is supported by a surround-type support apparatus 3, which maintains the structure's integrity without infringing on the necessary displacement requirements of the device. A magnet 4 and voice-coil 5 are used to provide electromagnetic coupling, which allows actuation of the diaphragm. This provides the electromotive force for maintaining optimal coupling of the diaphragm to the time-varying acoustic resonances. The magnet 4 is supported by a cutout cylindrical apparatus 6 that attaches to the case 7. The case 7 has a recessed area in the center 8 to contain the electronic circuitry 9 needed for sensor signal conditioning and implementing the adaptive algorithms and control laws. The battery power supply 10 needed for the circuitry 9 and the actuators is indicated between the control circuitry and the cylindrical support apparatus 6. Air vents 11 are provided to allow pressure equalization during lift-off and accent. The case 7 is supported by a flexible base 12 attached to the wall of the fairing. Depending on the nature of the attachment method, the support stiffness and damping are designed to maximize coupling to structural resonances and mitigate wall vibration. Piezoelectric elements 13 are incorporated into the base. By adjusting the effective stiffness of the base using the piezoelectric material, the natural frequency of the base can be adapted to track shifts in the structural resonances. The incorporation of a diaphragm motion sensor 14 and a wall motion sensor 15 are necessary for adaptation and tracking. The sensor measurements are filtered and used to optimize structural and acoustic coupling and control. FIG. 2 shows a cross-section schematic of the integrated device. FIG. 3 presents a side view of the integrated device, and FIG. 4 presents a top view of the integrated device.

Figure 5:
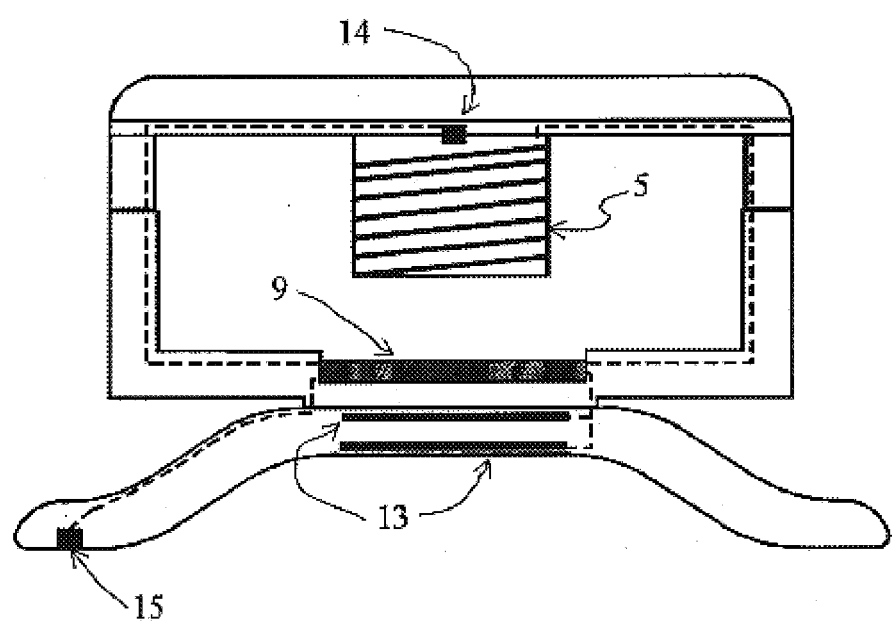
FIG. 5 is a cross-section schematic diagram of the device depicting sensor and actuator wiring paths.

FIG. 5 shows a cross-section schematic that indicates the internal wiring connections between the sensors 14, 15, the control circuitry 9, the piezoelectric actuators 13, and the voice-coil 5. In each case, the wiring, indicated with dashed lines, runs unobtrusively through the interior of the structure.

Figure 6:
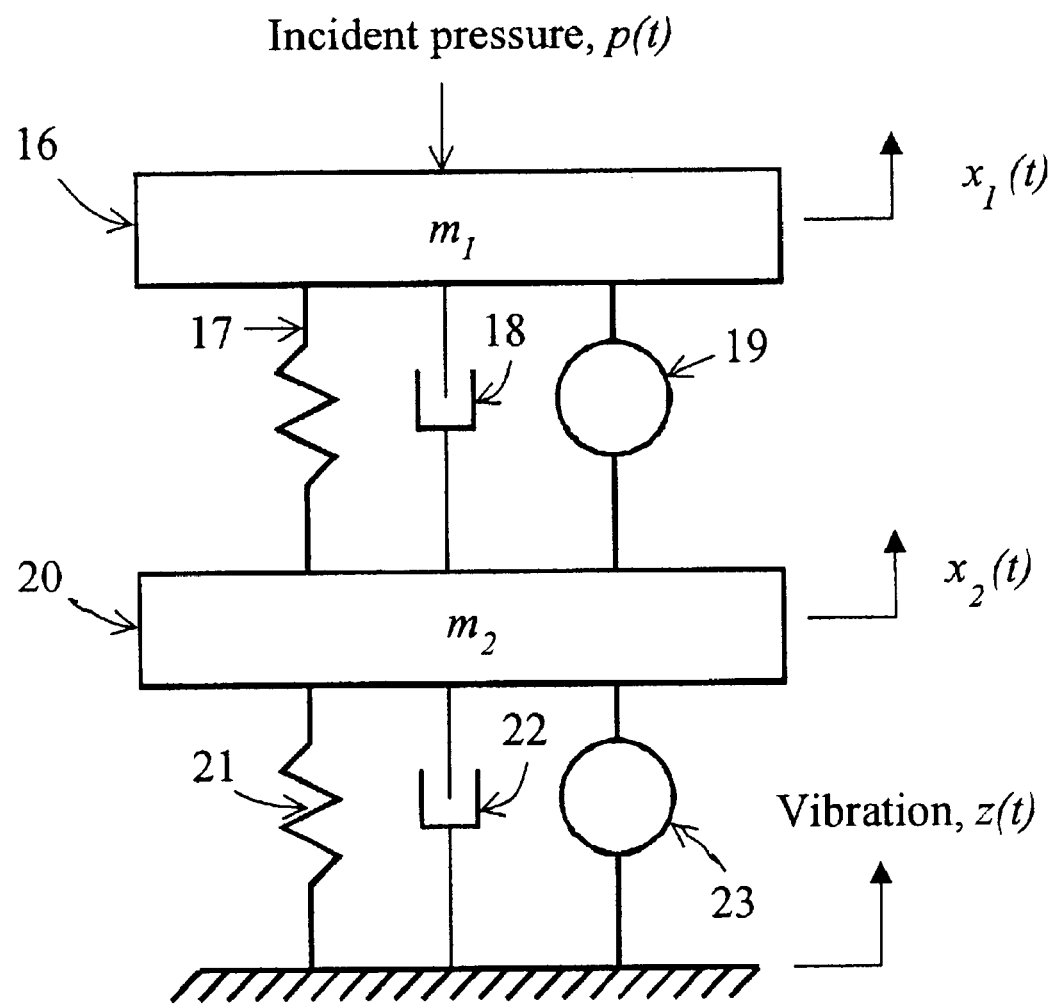
FIG. 6 is a free-body diagram that presents a mass-spring-damper engineering model of the device.

A free-body diagram of the device is presented in FIG. 6. The effective moving mass of the diaphragm 1, sensor 14, porous covering 2, and voice-coil 5 (FIG. 1) are represented as $m_1$ 16. The stiffness, $k_1$, and damping, $c_1$, provided by the mechanical suspension and electromotive suspension are represented by spring 17 and damping 18 elements, respectively. The electromotive force input applied by the voice-coil, $f_1(t)$, is indicated 19. The structural mass which includes the case 7, magnet 4, apparatus 6, circuitry 9, battery 10, and support apparatus 3 (FIG. 1) are represented by mass, $m_2$ 20. The stiffness, $k_2$, and damping, $c_2$, of the flexible base are represented by spring 21 and damping 22 elements, respectively. The force input applied by the piezoelectric material, $f_2(t)$, is indicated 23. The motion of $m_1$, $m_2$, and the fairing are represented by $x_1(t)$, $x_2(t)$, and $z(t)$, respectively. The incident acoustic pressure acting on the diaphragm is represented as $p(t)$.

Figure 7:
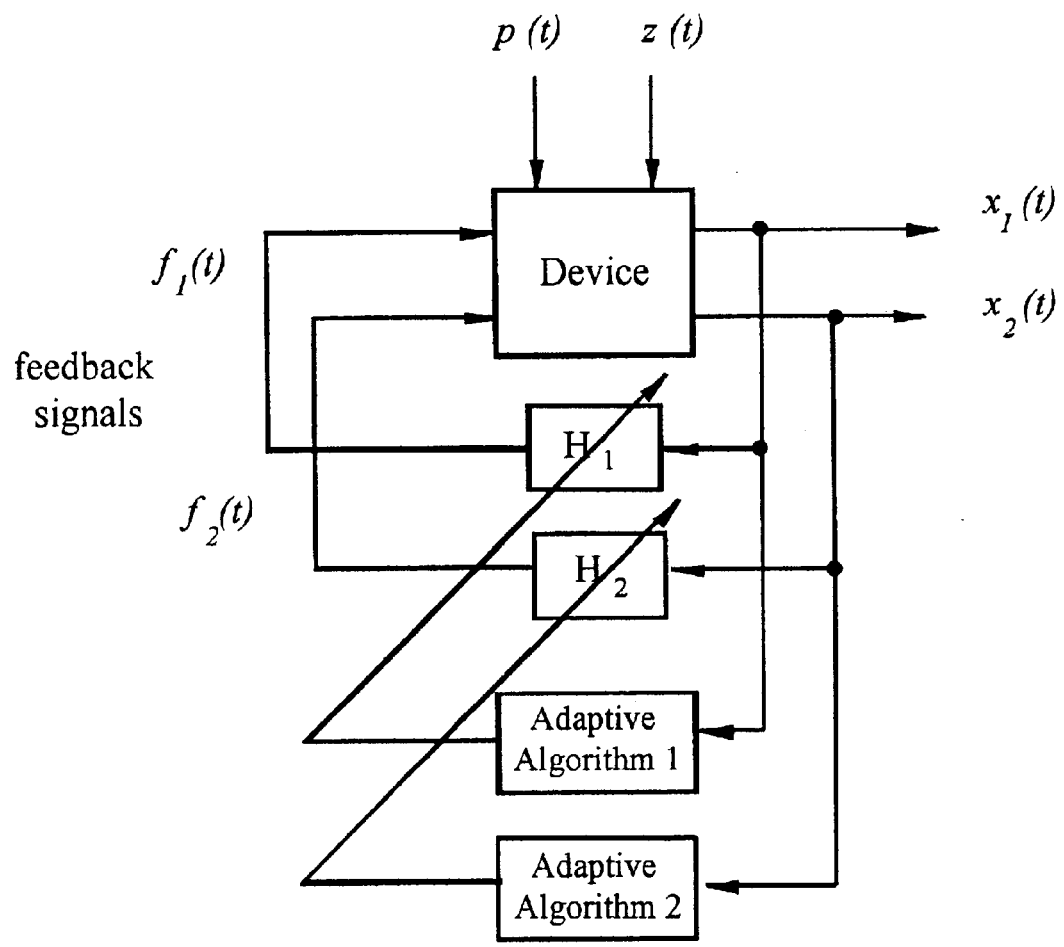
FIG. 7 is a block diagram engineering control model depicting the adaptive control configuration of the device.

Depending on the nature of the structural and acoustic dynamics and the target resonances to be attenuated, the tuning parameters $k_1$, $c_1$, $k_2$, and $c_2$ are defined to achieve three criteria: (1) dissipate acoustic energy arriving from $p(t)$; (2) reduce structural vibration $z(t)$; and (3) reduce sound radiation by uncoupling $p(t)$ and $z(t)$. The measured motion, $x_1(t)$ and $x_2(t)$, can be filtered by well known control laws and used to generate actuator signals, $f_1(t)$ and $f_2(t)$, in order to set the natural frequencies and damping ratios of the mass-spring-damper systems. By making the resonance of m proximal to an acoustic mode, energy can be dissipated through $c_1$. Setting the resonance frequencies can be achieved by using position feedback with $x_1(t)$. The damping of the diaphragm, $c_1$, can be augmented using rate feedback, $d\,x_1(t)/dt$. A combination of both, with additional roll-off filters, will maximize acoustic energy attenuation while insuring robustness. Likewise, the base 12 is tuned using a combination of $k_2$, $c_2$, and $f_2(t)$, to correspond to a dominant structural radiation mode in order to reduce its acoustic radiation efficiency and vibration energy. Simple motion feedback with roll-off can be used to tune the base's natural frequency and insure robustness. Also, using the measured motion signals, $x_1(t)$ and $x_2(t)$, the control laws can be adaptively updated to provide tracking of changes in target resonance frequencies. A block diagram of the adaptive control approach is given in FIG. 7, where $H_1$ and $H_2$ represent the control laws for $m_1$ and $m_2$, respectively.

We claim:

1. A stand-alone adaptive vibro-acoustic damper system for a wall-enclosed volume having time-varying acoustic resonance, said system comprised of:

a diaphragm matched to the acoustic impedance of said volume;

a voice coil attached to said diaphragm;

a diaphragm motion sensor attached to said diaphragm providing a voice coil input signal;

a magnet surrounding said voice coil, such that said magnet and said voice coil provide a varying electromotive force for maintaining optimal coupling of said diaphragm to said time-varying acoustic resonance in response to said voice coil input signal;

a surround-type support apparatus to support said diaphragm;

a battery power supply;

a vented case to hold said magnet, voice coil, diaphragm support and battery power supply;

a flexible base of variable stiffness attached to and supporting said case and attached to the wall of said enclosed volume;

a wall motion sensor attached to said flexible base providing a base input signal responsive to motion of the wall of said enclosed volume;

means for varying the stiffness of said flexible base in response to said base input signal; and means for varying said voice coil and base input signals such that said time-varying acoustic resonance within said wall-enclosed volume are minimized.

2. The stand-alone adaptive vibro-acoustic damper system of claim 1, wherein said means for varying the stiffness of said flexible base in response to said base input signal includes one or more piezoelectric actuators attached to said base.

3. The stand-alone adaptive vibro-acoustic damper system of claim 1, wherein:

said wall-enclosed volume has an acoustic impedance; and said diaphragm is treated with a porous material to match said diaphragm to said acoustic impedance.

4. The stand-alone adaptive vibro-acoustic damper system of claim 1, wherein said base stiffness varying means and said means for varying said voice coil and base input signals, are comprised of electronic control circuitry.

5. The stand-alone adaptive vibro-acoustic damper system of claim 4, wherein said electronic control circuitry is electrically connected to said diaphragm motion sensor, wall motion sensor, voice coil and battery power supply.

6. The stand-alone adaptive vibro-acoustic damper system of claim 4, wherein said base stiffness varying means is comprised of a piezoelectric actuator integrated with said flexible base.

7. The stand-alone adaptive vibro-acoustic damper system of claim 6, wherein said electronic control circuitry is electrically connected to said diaphragm motion sensor, wall motion sensor, voice coil, piezoelectric actuator and battery power supply.

8. The stand-alone adaptive vibro-acoustic damper system of claim 4, wherein said vented case also holds said electronic control circuitry.

9. The stand-alone adaptive vibro-acoustic damper system of claim 4, wherein said electronic control circuitry is for filtering measurements by said diaphragm motion sensor and said wall motion sensor to obtain filtered measurements, and for using said filtered measurements to optimize structural and acoustic coupling of said diaphragm to said time-varying acoustic resonance.

10. A adaptive vibro-acoustic damper system for a wall-enclosed volume having a time-varying acoustic resonance and an acoustic impedance, said system comprised of:

a diaphragm treated with a porous material to match said diaphragm to said acoustic impedance;

a diaphragm motion sensor attached to said diaphragm for providing a voice coil input signal;

a voice coil attached to said diaphragm and a magnet surrounding said voice coil, for providing a varying electromotive force for maintaining optimal coupling of said diaphragm to said acoustic resonance in response to said voice coil input signal;

a vented case containing and securing said magnet and voice coil, and supporting said diaphragm;

a flexible base having a variable stiffness and being attached to said vented case and to a wall of said wall-enclosed volume;

said flexible base including a wall motion sensor for providing a base input signal responsive to motion of said wall; and electronic control circuitry electrically connected to said diaphragm motion sensor, wall motion sensor and voice coil, for varying said stiffness of said flexible base in response to said base input signal, and for varying said voice coil and base input signals to minimize said acoustic resonance.

11. The stand-alone adaptive vibro-acoustic damper system of claim 10, further comprising a piezoelectric actuator integrated with said flexible base for operating in cooperation with said control circuitry to vary said stiffness of said flexible base in response to said base input signal.

12. The stand-alone adaptive vibro-acoustic damper system of claim 11, further comprised of:

a battery power supply; wherein said electronic control circuitry is electrically connected to the diaphragm motion sensor, wall motion sensor, voice coil, piezoelectric actuator and battery power supply, whereby the damper system is self-contained.

13. The stand-alone adaptive vibro-acoustic damper system of claim 12, wherein said vented case also contains said electronic control circuitry and said battery power supply.

14. The stand-alone adaptive vibro-acoustic damper system of claim 11, wherein said electronic control circuitry is for generating filtered measurements by filtering measurements made by said diaphragm motion sensor and said wall motion sensor, and for using said filtered measurements to optimize structural and acoustic coupling with said wall-enclosed volume.

15. The stand-alone adaptive vibro-acoustic damper system of claim 10, further comprised of:

a battery power supply; wherein said electronic control circuitry is electrically connected to the diaphragm motion sensor, wall motion sensor, voice coil and battery power supply, whereby the damper system is self-contained.

16. The stand-alone adaptive vibro-acoustic damper system of claim 10, wherein said electronic control circuitry is for generating filtered measurements by filtering measurements made by said diaphragm motion sensor and said wall motion sensor, and for using said filtered measurements to optimize structural and acoustic coupling with said wall-enclosed volume.

17. The stand-alone adaptive vibro-acoustic damper system of claim 16, further comprising a piezoelectric actuator integrated with said flexible base for operating in cooperation with said control circuitry to vary said stiffness of said flexible base in response to said base input signal.

18. A self-contained adaptive vibro-acoustic damper system for a wall-enclosed volume having a time-varying acoustic resonance and an acoustic impedance, comprised of:

a diaphragm treated with a porous material for matching said diaphragm to said acoustic impedance, said diaphragm including a diaphragm motion sensor attached to said diaphragm for providing an input signal to a voice coil;

said voice coil being attached to said diaphragm and being surrounded by a magnet, with said magnet and voice coil interacting and providing a varying electromotive force responsive to said input signal and acting on said diaphragm for maintaining optimal coupling of said diaphragm to said acoustic resonance;

a vented case containing said magnet and said voice coil, and supporting said diaphragm;

a flexible base having a variable stiffness and including a wall motion sensor;

said flexible base being attached to said vented case and also to a wall of said wall-enclosed volume;

said wall motion sensor for providing a base input signal responsive to vibration of said wall of said enclosed volume, to electronic control circuitry; and said electronic control circuitry being connected to said diaphragm motion sensor, wall motion sensor and voice coil, for varying said stiffness of said flexible base in response to said base input signal, and for varying said voice coil and said base input signals, whereby said acoustic resonance is minimized.

19. The self-contained adaptive vibro-acoustic damper system of claim 18, further comprised of a piezoelectric actuator integrated with said flexible base for cooperating with said electronic control circuitry to vary said stiffness of said flexible base in response to said base input signal.

20. The self-contained adaptive vibro-acoustic damper system of claim 19, further comprised of:

a battery power supply; wherein said electronic control circuitry is electrically connected to said diaphragm motion sensor, wall motion sensor, voice coil and battery power, whereby said damper system is self-contained.

* * * * *